(12) United States Patent
Haubold et al.

(10) Patent No.: US 8,677,621 B2
(45) Date of Patent: Mar. 25, 2014

(54) METHOD FOR THE REPAIR OF A COMPRESSOR ROTOR DESIGNED IN BLISK TECHNOLOGY

(75) Inventors: Thomas Haubold, Wehrheim (DE); Claudia Berkenhoff, Grävenwiesbach (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 697 days.

(21) Appl. No.: 11/826,524

(22) Filed: Jul. 16, 2007

(65) Prior Publication Data

US 2008/0040924 A1 Feb. 21, 2008

(30) Foreign Application Priority Data

Jul. 17, 2006 (DE) .......................... 10 2006 033 299

(51) Int. Cl.
*B23P 6/00* (2006.01)

(52) U.S. Cl.
USPC ........................................ 29/889.1; 29/889.2

(58) Field of Classification Search
USPC .................. 29/889.1, 889.21, 889.23, 889.7, 29/402.01, 402.03, 402.04, 402.05, 29/402.06, 402.07, 402.08, 402.09, 29/402.11, 402.13, 402.16, 402.19, 402.21
See application file for complete search history.

(56) References Cited

U.S. PATENT DOCUMENTS

| | | | | |
|---|---|---|---|---|
| 2,317,092 A * | 4/1943 | Allen | ......................... | 415/198.1 |
| 2,440,933 A * | 5/1948 | Cunningham, Jr. | ............. | 416/95 |
| 2,637,521 A * | 5/1953 | Constantine et al. | ..... | 416/244 R |
| 3,067,490 A * | 12/1962 | Luthy et al. | .................. | 29/889.2 |
| 3,626,140 A * | 12/1971 | Peyrot | ....................... | 219/121.13 |
| 3,876,335 A * | 4/1975 | Forcinal et al. | ........... | 416/198 R |
| 3,967,919 A * | 7/1976 | Coulon et al. | ............. | 416/198 A |
| 4,017,212 A * | 4/1977 | Gordienne et al. | ....... | 416/198 A |
| 4,063,062 A * | 12/1977 | Kuhnen | .................... | 219/121.14 |
| 4,086,690 A * | 5/1978 | Bernasconi | .................. | 29/889.2 |
| 4,743,165 A * | 5/1988 | Ulrich | ........................ | 416/198 A |
| 5,106,010 A * | 4/1992 | Stueber et al. | ................ | 228/232 |
| 5,414,929 A * | 5/1995 | Floser et al. | ................ | 29/889.21 |
| 5,466,910 A * | 11/1995 | Ebeling et al. | ........... | 219/130.01 |
| 6,049,979 A * | 4/2000 | Nolan et al. | .................. | 29/889.1 |
| 6,145,194 A * | 11/2000 | Munson et al. | .............. | 29/889.1 |
| 6,152,697 A * | 11/2000 | Konishi et al. | ............ | 416/213 R |
| 6,324,831 B1 * | 12/2001 | Izadi et al. | ...................... | 60/796 |
| 6,375,421 B1 * | 4/2002 | Lammas et al. | ........... | 415/199.5 |
| 6,568,077 B1 * | 5/2003 | Hellemann et al. | ......... | 29/889.1 |
| 7,370,787 B2 * | 5/2008 | Bacon et al. | ................ | 228/112.1 |
| 7,416,393 B2 * | 8/2008 | Richter | ..................... | 416/213 R |
| 7,473,475 B1 * | 1/2009 | Matheny et al. | ............. | 428/598 |
| 2005/0127138 A1 * | 6/2005 | Bacon et al. | ................ | 228/112.1 |
| 2005/0186080 A1 | 8/2005 | Chivers et al. | | |

FOREIGN PATENT DOCUMENTS

| | | |
|---|---|---|
| DE | 10 2004 002 965 A1 | 8/2005 |
| DE | 102004002965 | 8/2005 |
| EP | 1153699 | 11/2001 |
| GB | 2079659 A * | 1/1982 |

OTHER PUBLICATIONS

European Search Report dated Jun. 14, 2010 from counterpart European patent application.

* cited by examiner

*Primary Examiner* — David Bryant
*Assistant Examiner* — Jacob Cigna
(74) *Attorney, Agent, or Firm* — Timothy J. Klima; Shuttleworth & Ingersoll, PLC

(57) ABSTRACT

With a method for the repair of compressor rotors designed in blisk technology the damaged stage is severed from the rotor, and a new blisk is joined to the rotor by electron-beam welding. For stress relieving the rotor is subjected to local thermal treatment by means of a current produced in the weld area by electro-magnetic induction.

4 Claims, No Drawings

METHOD FOR THE REPAIR OF A COMPRESSOR ROTOR DESIGNED IN BLISK TECHNOLOGY

This application claims priority to German Patent Application DE 10 2006 033 299.7 filed Jul. 17, 2006, the entirety of which is incorporated by reference herein.

This invention relates to a method for the repair of a compressor rotor designed in blisk technology and having a plurality of blisks joined to form a one-piece assembly in which a severely damaged stage is replaced by a new one and the rotor is subsequently subjected to thermal treatment.

On gas turbine engines, as is generally known, compressors are used which include several rotor stages which are joined to form a one-piece assembly and are each designed in blisk technology, with the rotor blades being integral with the disk. Severely damaged blades or blade portions are usually cut off and replaced by new repair elements attached in a welding process. In order to reduce the stresses produced in the weld-near area, the entire compressor drum, or only the internally stressed weld zone of the repaired blade, must be subjected to thermal treatment. Thermal treatment of the entire compressor may, however, result in distortion of the latter, entailing costly mechanical rework. Also, previously removed coatings must be re-applied and the surface re-hardened. For performance of a local heat treatment confined to the respective weld area, costly capsule techniques are known preventing the non-damaged parts of the blisk from being heated.

Since effort and cost for the repair of severely damaged compressors is particularly high in connection with a local thermal treatment, one or several of the blisks joined to each other by welding are in this case removed, or severed, from the compressor and replaced by new blisks fitted in a welding process. In this case, the compressor having several blisks joined to each other by welding must, however, be subjected to thermal treatment in a furnace which leads to the disadvantages described above.

In a broad aspect, the present invention provides for a significant reduction of the work effort for the repair of severely damaged compressors.

It is a particular object of the present invention to provide an improved method for construction and repair in accordance with the features described herein. Useful developments of the invention will be apparent from the present description.

The essential idea of the present invention is that a new blisk is electron-beam welded to the compressor rotor as replacement for the destroyed blisk (or during new construction) and that both the weld and the confined adjacent zones affected by the weld heat are subjected to a stress-relieving treatment using inductively generated heat. The induction parameters can be set such that the current induced into the component for heat generation is actually confined to the welding area and the temperature required for stress relieving is produced in this area only. Coatings previously applied to the compressor rotor need not be stripped prior to thermal treatment and, therefore, not be re-applied in a subsequent process. Re-treatment of the blades for surface hardening is similarly not required. Finally, localized thermal treatment provides for minimum distortion of the rotor, as a result of which the otherwise required costly mechanical rework will similarly no longer be necessary, or only to a lesser extent. Locally confined generation of heat enables the repair process to be repeated more frequently. The heat required for the thermal treatment is produced locally peripherally along the weld joint.

The method is applicable to both the repair and the manufacture of blisk rotors. Advantageous here are the dispensability of the cost-intensive thermal treatment of an entire rotor assembly in a furnace and the rapidity of the local thermal treatment which is even integratable into the welding process.

This invention is more fully described in the light of a preferred embodiment.

On a compressor whose rotor is constructed from blisks joined to each other and features a plurality of damaged blades in a stage, the affected blisk is severed from the compressor drum and replaced by a new disk with integral blades (blisk) which is joined to the compressor drum by electron-beam welding. After welding the replacement disk to the compressor rotor (rotor subassembly) and not before or during welding, only the weld joint and the areas adjacent to the weld joint which are strongly heated in the welding process are subjected to local thermal treatment by inductive heating, in that a current is induced into the weld joint and a confined bi-lateral area of the rotor using a magnetic field produced on the periphery of the joint, thus generating the temperature required for thermal treatment of the material. The parameters for the locally confined thermal treatment can be well set so that the compressor rotor will generally distort only slightly and rework due to thermal distortion will not be necessary, or to a minor extent only. Furthermore, surface re-coating necessary after furnace heat treatment of the entire rotor and/or surface re-hardening, for example by glass bead peening, of the non-locally heat-treated areas is now obsolete. Upon thermal treatment, inspection of the weld joint and, if applicable, mechanical rework in the weld joint area is performed. The method is applicable to all compressor rotors, both in blisk and conventional technology (disk/blade).

What is claimed is:

1. A method for repairing a compressor rotor designed in blisk technology and having a plurality of blisks joined together to form a one-piece assembly, comprising:
   severing from the rotor and removing an entire damaged stage of a blisk having integral blades, the severing being performed away from the integral blades;
   replacing the entire damaged stage of the blisk with an undamaged blisk stage;
   joining the undamaged blisk stage to the rotor by electron-beam welding; and
   subsequently to the electron-beam welding and not before or during the electron-beam welding, subjecting only a weld joint and a locally confined area adjacent to the weld joint which has been affected by a heat of the weld to local stress-relieving thermal treatment by a current induced into the component by electro-magnetic induction for heat generation, the current induced into the component for heat generation being confined to the weld joint and the locally confined area adjacent to the weld joint such that a temperature required for the stress-relieving thermal treatment is produced only in the weld joint and locally confined area adjacent to the weld joint, peripherally along the weld joint, away from the integral blades.

2. A method in accordance with claim 1, wherein the weld joint is inspected and subjected to mechanical rework, if necessary.

3. A method for manufacturing blisk rotors designed in blisk technology and having a plurality of blisks joined together to form a one-piece assembly, comprising:
   joining an entire stage of a blisk having integral blades to a rotor sub-assembly by electron-beam welding along a peripheral joint away from the integral blades; and subsequently to the electron-beam welding and not before or during the electron-beam welding, subjecting only a weld joint and a locally confined area adjacent to the weld joint which has been affected by a heat of the weld to local stress-relieving thermal treatment by a current induced into the component by electro-magnetic induction for heat generation, the current induced into the component for heat generation being confined to the weld joint and the locally confined area adjacent to the weld joint such that a temperature required for the stress-relieving thermal treatment is produced only in the weld joint and locally confined area adjacent to the weld joint, peripherally along the weld joint, away from the integral blades.

4. A method for repairing a compressor rotor designed in blisk technology and having a plurality of blisks joined together to form a one-piece assembly, comprising:

severing from the rotor and removing an entire damaged stage of a blisk having integral blades, the severing being performed away from the integral blades;

replacing the entire damaged stage of the blisk with an undamaged blisk stage;

joining the undamaged blisk stage to the rotor by electron-beam welding; and only after the electron-beam welding, subjecting only a weld joint and a locally confined area adjacent to the weld joint which has been affected by a heat of the weld to local stress-relieving thermal treatment by a current induced into the component by electro-magnetic induction for heat generation, the current induced into the component for heat generation being confined to the weld joint and the locally confined area adjacent to the weld joint such that a temperature required for the stress-relieving thermal treatment is produced only in the weld joint and locally confined area adjacent to the weld joint, peripherally along the weld joint, away from the integral blades.

\* \* \* \* \*